(No Model.)

G. SUTTON.
LID FOR JUGS.

No. 424,034.  Patented Mar. 25, 1890.

Witnesses:

Inventor:
George Sutton
by John J. Halsted
his Attys.

UNITED STATES PATENT OFFICE.

GEORGE SUTTON, OF LANCASTER, ENGLAND.

LID FOR JUGS.

SPECIFICATION forming part of Letters Patent No. 424,034, dated March 25, 1890.

Application filed July 17, 1889. Serial No. 317,794. (No model.) Patented in England April 14, 1888, No. 5,579.

*To all whom it may concern:*

Be it known that I, GEORGE SUTTON, a subject of the Queen of Great Britain, residing at Lancaster, England, have invented new and useful Improvements relating to Lids or Covers for Jugs and other Vessels, (patented in Great Britain by Letters Patent dated April 14, 1888, No. 5,579,) of which the following is a specification.

My invention relates to lids or covers for jugs and other vessels, and especially to that class of such lids or covers which are carried upon trunnions and which are balanced so as to remain in a horizontal position, and thus automatically open when the jug or the like is tipped.

According to my said invention the front part of the lid in proximity to the portion of the same nearest to the lip or spout of the jug to which it is applied is provided with a strainer of fine gauze, the said strainer being of sufficient depth to allow the contents of the vessel to pass through it at any angle of the said vessel.

My improved strainer is especially applicable to vessels for containing coffee and other liquids which it is desirable to pass through a strainer.

To enable my invention to be clearly understood, I will describe how it may be carried into practice by reference to the accompanying drawings, in which—

Figure 1:
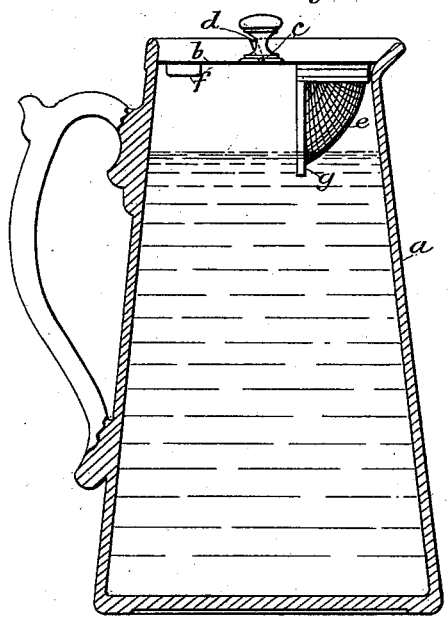
Figure 2:
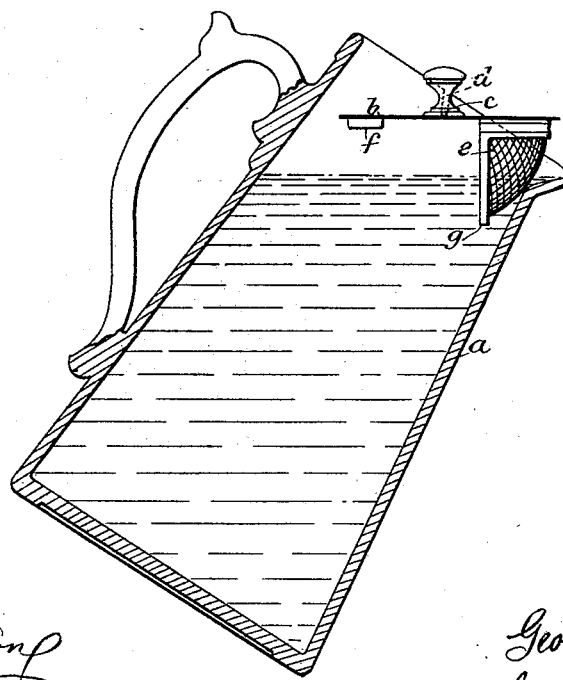

Figure 1 is a sectional view of a jug provided with my improvements and in a vertical position, and Fig. 2 is a similar view of the jug in an inclined position.

*a* is the body of the jug, and *b* is the lid or cover, which, as shown, is mounted upon pins or trunnions *c*, carried in notches *d*.

*e* is the strainer, which is attached to the under side of the lid, and *f* is a counter-weight for maintaining the said lid in a horizontal position, notwithstanding the inclination of the jug. The strainer is so shaped in horizontal section as to correspond with the internal configuration of the adjacent part of the jug to which it is applied, and in vertical section to correspond with the arc of a circle the center of which is the axis of the lid. By thus shaping the strainer it will be in close contact with the jug at any angle of the latter—for instance, as shown in Fig. 2—so that no space will be left between the said strainer and the jug, whereby any liquid poured out of the jug will have to pass through the strainer.

*g* is a lug, which may be formed upon the strainer to prevent the strainer from moving so far as to leave an open space between the edge of the latter and the jug.

Although I have described my improvements as applied to balanced lids, I wish it understood that they are also applicable to lids which are hinged to their respective vessels. In this case the vertical curve of the strainer corresponds to the arc of a circle having its center at the hinge-joint.

Having now particularly described and ascertained the nature of my said invention and in what manner the same is to be performed, I declare that what I claim is—

1. A jug or other vessel having a swinging lid or cover provided with a balanced strainer attached thereto projecting downward therefrom, such strainer, when the jug or vessel is tipped or the lid or cover opened, serving to cover the space between the cover and the discharging-mouth of the vessel, substantially as described.

2. A jug or other vessel having a swinging lid or cover provided with a strainer, and also with a counterweight to render the cover self-balancing, the strainer projecting downward and having the shape substantially as and for the purposes described.

3. A jug or vessel having a cover *b*, and pins or trunnions serving as supports for said cover, combined with a strainer *e*, secured under its front side and shaped and arched as set forth, and with a counter-weight *f* at its rear side, the whole being and operating substantially as set forth.

GEORGE SUTTON.

Witnesses:
 JAMES WATSON,
 SARAH TAYLOR.